(12) United States Patent
Bertolini

(10) Patent No.: US 10,197,882 B2
(45) Date of Patent: Feb. 5, 2019

(54) SWITCHABLE WINDOW

(71) Applicant: ISOCLIMA S.p.A., Este (IT)

(72) Inventor: Marco Bertolini, Este (IT)

(73) Assignee: ISOCLIMA S.P.A., Este (IT)

(*) Notice: Subject to any disclaimer, the term of this patent is extended or adjusted under 35 U.S.C. 154(b) by 67 days.

(21) Appl. No.: 14/796,845

(22) Filed: Jul. 10, 2015

(65) Prior Publication Data

US 2016/0011483 A1 Jan. 14, 2016

(30) Foreign Application Priority Data

Jul. 11, 2014 (EP) .................................... 14425094

(51) Int. Cl.
*G02F 1/157* (2006.01)
*E06B 9/24* (2006.01)
*B64C 1/14* (2006.01)
*G02F 1/1334* (2006.01)
*G02F 1/1333* (2006.01)
*G02F 1/137* (2006.01)
*G02F 1/153* (2006.01)
*B32B 17/10* (2006.01)

(52) U.S. Cl.
CPC ........ *G02F 1/157* (2013.01); *B32B 17/10036* (2013.01); *B32B 17/1077* (2013.01); *B32B 17/10532* (2013.01); *B32B 17/10761* (2013.01); *B32B 17/10788* (2013.01); *B64C 1/14* (2013.01); *E06B 9/24* (2013.01); *G02F 1/137* (2013.01); *G02F 1/1334* (2013.01); *G02F 1/133305* (2013.01); *G02F 1/1533* (2013.01); *B32B 2369/00* (2013.01); *B32B 2375/00* (2013.01); *B32B 2605/18* (2013.01); *E06B 2009/2411* (2013.01); *E06B 2009/2417* (2013.01); *E06B 2009/2464* (2013.01); *G02F 2001/1536* (2013.01)

(58) Field of Classification Search
CPC .... E06B 2009/2464; E06B 9/24; G02F 1/153; G02F 1/163; H01L 31/042; H02S 20/20; Y02E 10/50
USPC ................................................. 359/265–275
See application file for complete search history.

(56) References Cited

U.S. PATENT DOCUMENTS

| | | | |
|---|---|---|---|
| 6,407,847 B1* | 6/2002 | Poll | E06B 3/66 252/583 |
| 6,493,128 B1* | 12/2002 | Agrawal | B32B 17/10036 244/129.3 |
| 2007/0210287 A1 | 9/2007 | Guerra | |
| 2009/0093578 A1* | 4/2009 | Guerra | G02B 5/208 524/404 |
| 2009/0135319 A1 | 5/2009 | Veerasamy | |
| 2010/0092784 A1* | 4/2010 | Kamada | B32B 17/10 428/426 |

(Continued)

*Primary Examiner* — Joseph P Martinez
*Assistant Examiner* — Vipin Patel
(74) *Attorney, Agent, or Firm* — Hauptman Ham, LLP

(57) ABSTRACT

A switchable window, in particular for use in an aircraft, helicopter, or space vehicle, includes an outer pane construction subjected to sunlight, and an inner pane construction having an electrically switchable film for changing a color or transmittance of the switchable window, the outer pane construction covering at least an irradiated part of the inner pane construction. The outer pane construction absorbs IR radiation of the sunlight and it absorbs or reflects UV radiation of the sunlight.

15 Claims, 2 Drawing Sheets

(56) References Cited

U.S. PATENT DOCUMENTS

| | | | |
|---|---|---|---|
| 2010/0316886 A1* | 12/2010 | Rashid | C08J 7/045 428/623 |
| 2011/0078960 A1* | 4/2011 | Luttmann | E04B 2/827 52/64 |
| 2011/0292502 A1* | 12/2011 | Meyer | C08K 3/04 359/359 |
| 2012/0157587 A1 | 6/2012 | Meyer et al. | |
| 2012/0307337 A1 | 12/2012 | Bartug et al. | |
| 2013/0321915 A1* | 12/2013 | Chien | G02B 27/281 359/485.03 |
| 2014/0133008 A1* | 5/2014 | Mitchell | B60J 3/04 359/275 |
| 2014/0300945 A1* | 10/2014 | Parker | E06B 9/24 359/275 |

\* cited by examiner

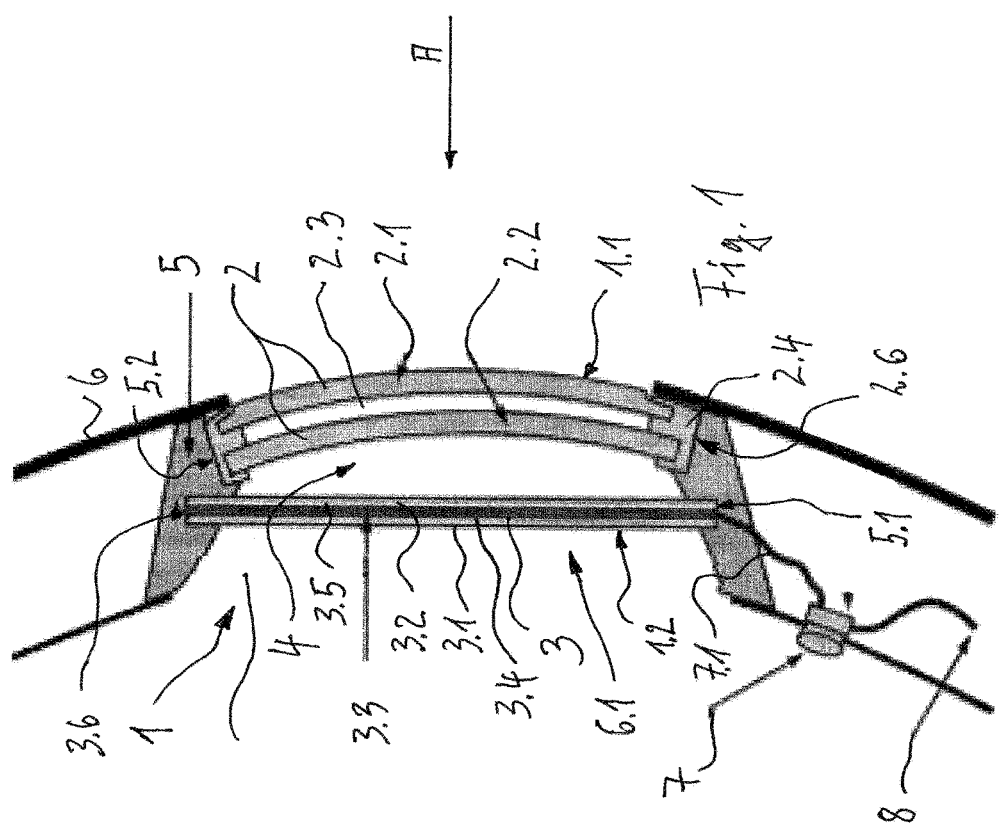

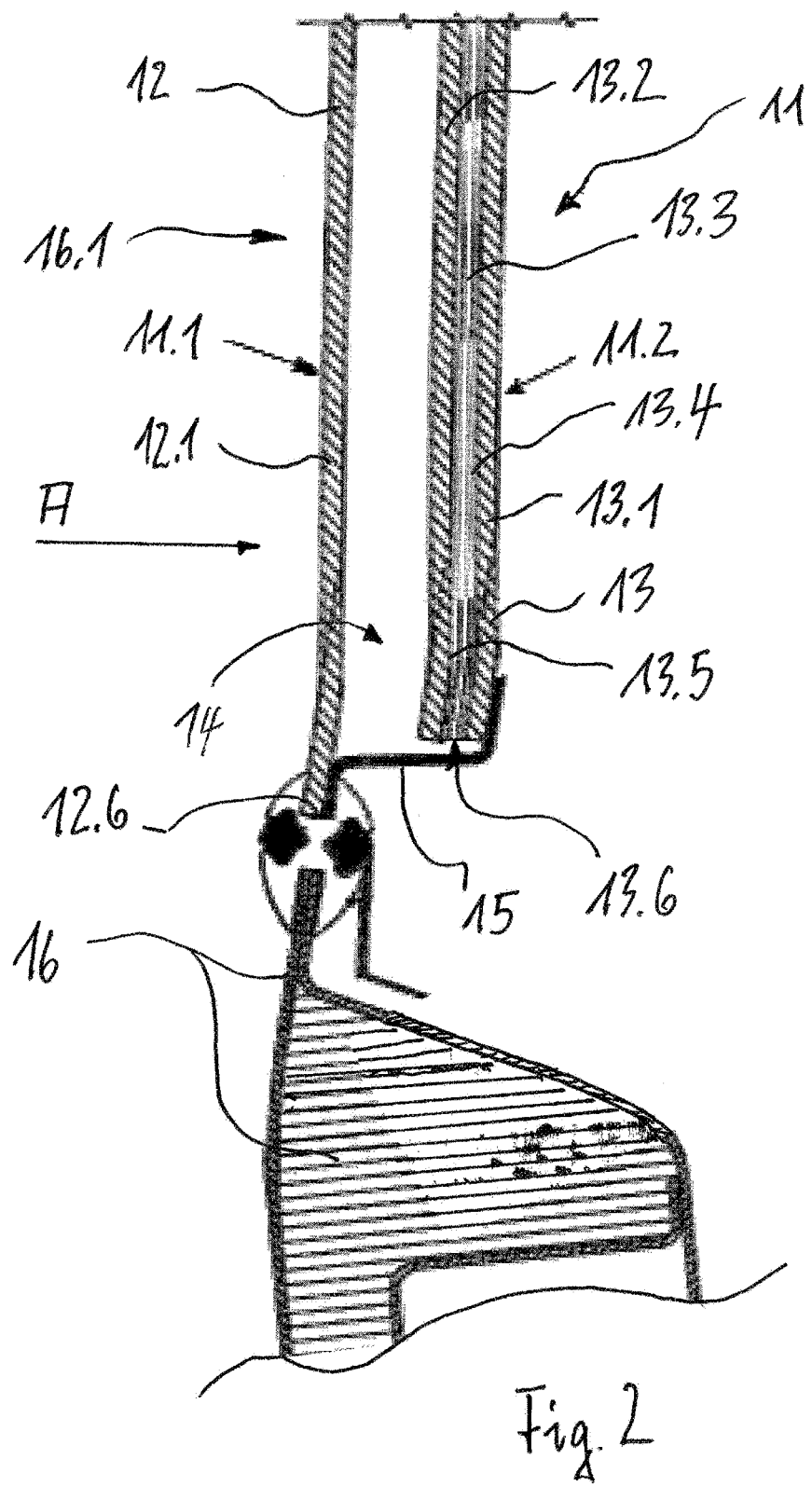

SWITCHABLE WINDOW

RELATED APPLICATIONS

The present application claims priority from European Application Number 14425094.1, filed Jul. 11, 2014, the disclosure of which is hereby incorporated by reference herein in its entirety.

The present invention relates to a switchable window according to the preamble of claim 1, in particular for use in an aircraft, helicopter, or space vehicle.

As explained in US 2012/0307337 A1 electrochromics with reversible reaction may be used for changing and controlling the color or transmittance of an electrically switchable window or glazing panel. Known electrochromic devices are, for instance, a suspended particle (SPD) emulsion or film or a polymer dispersed liquid crystal (PDLC) film. When an electrical ac voltage is applied across the electrochromic film, a change of the color or light transmittance of the film occurs. The switchable film and, thus, also the switchable panel or window using it, can degrade due to ultraviolet (UV) radiation and too high temperatures which results in a decrease of the possible maximum transmission of visible light through the switchable window over time.

It is thus an object of the present invention to provide a switchable window maintaining maximum transmission over time.

This object is solved by the switchable window of claim 1. Accordingly, the switchable window of the present invention, which is preferably used in an aircraft, a helicopter or space vehicle, comprises an outer pane construction subjected to sunlight from outside, and an inner pane construction having an electrically switchable film for changing a color or transmittance of the switchable window, wherein the outer pane construction covers at least an irradiated part of the inner pane construction and the outer pane construction absorbs infrared (IR) radiation of the sunlight and it absorbs or reflects at least a part of the UV radiation of the sunlight. Accordingly, the switchable window of the present invention provides the considerable advantage that the outer pane construction avoids or reduces substantially that UV radiation and heat resulting from IR radiation can reach the switchable film of the inner pane construction which helps to avoid or reduce a degrading of the switchable film that, therefore, can maintain a high maximum transmission for visible light even over time.

The outer pane construction may comprise at least one transparent pane made of polymethylmethacrylate (PMMA), polycarbonate (PC), or polyethylentherephtalate (PET) which can support a high maximum transmission of visible light.

The switchable window of the invention may comprise two PMMA panes in the outer double pane construction which are arranged in parallel to each other and with a distance or space there between to ensure high absorption of UV and IR radiation and general protective requirements, for instance, in an airplane.

Preferably, the outer pane construction has at least one PMMA pane, PC pane or PET pane or sheet which comprises an IR absorber including nanoparticles of hexaboride in order to ensure high IR absorption in the pane with excellent transmission of visible light. In particular, a PMMA pane or acrylic pane may be used which includes nanoparticles of hexaboride. This PMMA pane or clear acrylic pane then shows high transmission of more than 80% for visible light in the range between ca. 400 to ca. 780 nm wavelength of radiation together with a high absorption of IR radiation in the range above ca. 780 nm. As explained in detail in US 2007/0210287 A1, the particle size of the hexaboride nanoparticles may be 200 nm or less or even 100 nm or less.

Further, the PMMA pane, the PC pane, or PET sheet may comprise a perylene based dye as additive which, together in a blend with the hexaboride IR absorber, results in an improved transmission of visible light of the PMMA pane or clear acrylic pane as compared to a PMMA pane only using the hexaboride IR absorber as additive.

In addition, the PMMA pane, the PC pane or PET sheet may comprise an UV absorber including a chromophore as additive to realize a high absorption of UV radiation in the pane. In particular, a PMMA pane or clear acrylic pane may be used in the invention which includes a chromophore as additive to ensure or to substantially increase the UV absorption in the PMMA pane or clear acrylic pane. This modified PMMA pane or modified acrylic pane using IR and UV absorbers then can show approximately 0% transmission of UV radiation in a range below ca. 400 nm wavelength of radiation. This very high UV absorption results in a high degree of UV protection of the switchable film in the inner pane construction.

Further, the modified clear PMMA pane comprises preferably a transmission of visible light of up to approximately 83% (=LT) and a total solar energy transmission of up to approximately 50% (=TSE) resulting in a high transmission ratio LT/TSE of up to 1.66. Also a colored modified PMMA pane, for instance, a green modified PMMA pane, can comprise a transmission of visible light of up to approximately 72% (=LT) and a total solar energy transmission of up to approximately 45% (=TSE) resulting in a high transmission ratio LT/TSE of up to 1.60.

Preferably, the outer pane construction and the inner pane construction are arranged with a distance or spacing there between to avoid a direct heating of the switchable film in the inner pane construction. The at least one PMMA pane or clear acrylic pane of the outer pane construction and the electrically switchable film of the inner pane construction can be arranged with a distance or spacing there between.

The electrically switchable film may be an electrochromic device, in particular a suspended particle device (SPD) emulsion or a polymer dispersed liquid crystal (PDLC) film, to ensure a reliable switching function and control of light transmittance.

The inner pane construction may be realized as a SPD electrochromic laminated panel or unit to have a compact and easy to install inner pane construction and to allow its exchange independently of the outer pane construction that may be, for instance, a double PMMA glazing or single PMMA pane. More general, the outer pane construction may be a double glazing structure unit comprising a PMMA pane and a glass pane, a polycarbonate pane, or a further PMMA pane.

A dust protective cover sheet, in particular made of polycarbonate, may be provided in the switchable window which is arranged on an inside of the switchable window, wherein the inner pane construction with electrically switchable film is arranged between the protective cover sheet and the outer pane construction. The protective cover sheet may be replaced by the inner pane construction with switchable film or by the SPD electrochromic laminated panel.

Further advantageous embodiments of the present invention are mentioned in the dependent claims. Further advantages, advantageous embodiments, and usages of the invention can be seen from the following description of exemplary and preferred embodiments of the invention with reference to the accompanying drawings, wherein:

FIG. 1 is a schematic cross-sectional view of a preferred embodiment of the electrically switchable window of the invention to be used in an airplane; and FIG. 2 is a schematic cross-sectional partial edge view of a further embodiment of the electrically switchable window of the invention to be used in a helicopter.

FIG. 1 shows a view in cross-section of an electrically switchable window 1 according to a preferred embodiment of the invention to be used, for instance, in an aircraft or airplane. The switchable window 1 comprises an outer pane construction 2, an inner pane construction 3, and a continuous spacing 4 between the inner pane construction 3 and the outer pane construction 2 which means that the switchable window 1 is not a laminated window due to the spacing 4. FIG. 1 shows an arrow A which represents the direction of sunlight from the environment which irradiates the transparent switchable window 1 on its outside surface 1.1. An inside surface 1.2 of the switchable window 1 faces the interior of the aircraft. The switchable window 1 is installed in a corresponding window opening 6.1 provided in the body 6 of the aircraft.

The switchable window 1 has a circumferential continuous frame 5, rabbet or encapsulation in which a circumferential edge 3.6 of the inner pane construction 3 is fixed in a corresponding circumferential groove 5.1 of the frame 5. The outer pane construction 2 has a circumferential edge 2.6 which is fixed in a corresponding circumferential continuous further groove 5.2 of the frame 5 of the switchable window 1.

The inner pane construction 3 is formed as a laminated SPD panel which replaces a protective PC pane usually used and which comprises an inner sheet 3.1 made of PC, PMMA or glass, an electrically switchable electrochromic SPD film 3.3 or SPD film unit, an outer sheet 3.2 made of PC, PMMA or glass, an interlayer 3.4 between the inner sheet 3.1 and the SPD film 3.3 to attach the inner sheet 3.1 on the SPD film 3.3, and a further interlayer 3.5 between the outer sheet 3.1 and the SPD film 3.3 or SPD film unit to attach the outer sheet 3.3 on the SPD film 3.3. The material of the interlayers 3.4 and 3.5 may be polyurethane (PU), polyvinylbutyral (PVB), or ethylenvvinylacetate (EVA) in the form of a foil. An inside surface of the inner sheet 3.1 corresponds to the inside surface 1.2 of the switchable window 1.

The SPD film 3.3 is electrically coupled via an appropriate wiring 7.1 to a switch 7 that is electrically coupled to an aircraft power line supplying AC voltage. If the switch is on, AC voltage is applied across the SPD film 3.3 to maintain it in transparent mode. If the switch 7 is operated to off, no AC voltage is applied across the SPD film 3.3 to switch it into the opaque non-transparent mode.

The non-laminated outer pane construction 2 comprises an outer PMMA pane 2.1 and an inner PMMA pane 2.2 which are in parallel to each other and which are curved. An outside surface of the outer PMMA pane 2.1 corresponds to the outside surface 1.1 of the switchable window 1. This double glazing structure has to sustain the differential pressure between the pressurized cabin or interior environment of the aircraft and the outside environment.

The transparent outer and inner PMMA panes 2.1 and 2.2 are of clear acrylic and include as additives an IR absorber that may comprise nanoparticles of hexaboride, for instance, KHDS-872G2 containing $LaB_6$ commercially available from Sumitomo Metal Mining, a dye based on perylene for improving and supporting the ability of IR absorption, for instance, LUMOGEN IR 788 commercially available from BASF Corporation, and an UV absorber containing a chromophore, for instance, CGX UVA 006 commercially available from BASF Corporation. Each of these PMMA panes 2.1 and 2.2 shows approximately 0% transmission in an UV range <400 nm wavelength, a high maximum transmission of approximately 83% in the visible light range of 400 nm to 780 nm, and a decreasing transmission of approximately 20% or less in an IR range from 780 nm to 2500 nm. Consequently, approximately 100% of UV radiation and approximately 80% of IR radiation are absorbed by each of the PMMA panes 2.1 and 2.2.

Each of the PMMA panes 2.1 and 2.2 may comprise a transmission of visible light of up to approximately 83% (=LT) and a total solar energy transmission of up to approximately 50% (=TSE) resulting in a high transmission ratio LT/TSE of up to 1.66.

There is a double pane spacing 2.3 between the outer PMMA pane 2.1 and the inner PMMA pane 2.2. The edges of the PMMA panes 2.1 and 2.2 are inserted and fixed in a circumferential rabbet structure 2.4 at the edge 2.6 of the outer pane construction 2. The rabbet structure itself is arranged in the corresponding further window groove 5.2 of the frame 5 of the switchable window 1.

The spacing 4 between the inner pane construction 3 and the outer pane construction 2 or, in more detail, between the outer sheet 3.2 of the inner pane construction 3 and the inner PMMA pane 2.2 of the outer pane construction 2 avoids the heat transfer from the inner PMMA pane 2.2 of the outer sheet 3.3 of the inner pane construction 3 to protect the SPD film 3.3 against heat from the PMMA panes 2.1 and 2.2. Most heat resulting from the IR absorption and UV absorption in the PMMA panes 2.1 and 2.2 is dissipated into outside air.

FIG. 2 shows a view in cross-section of an electrically switchable window 11 according to a further preferred embodiment of the invention to be used, for instance, in a helicopter. The switchable window 11 comprises an outer pane construction 12, an inner pane construction 13, and a continuous spacing 14 between the inner pane construction 13 and the outer pane construction 12 which means that the switchable window 11 is not a laminated window due to the spacing 14. FIG. 2 shows an arrow A which represents the direction of sunlight from the outside environment which irradiates the transparent switchable window 11 on its outside surface 11.1. An inside surface 11.2 of the switchable window 11 faces the interior of the helicopter. The switchable window 11 is installed in a corresponding window opening 16.1 provided in the body 16 of the helicopter.

The switchable window 11 has a circumferential continuous frame 15 or spacer, rabbet or encapsulation on which a circumferential edge 13.6 of the inner pane construction 13 is fixed. The outer pane construction 12 has a circumferential edge 12.6 which is fixed also on the frame 15 of the switchable window 11.

The inner pane construction 13 is formed as a laminated SPD panel which comprises an inner sheet 13.1 made of transparent or clear PC, PMMA or glass, an electrically switchable electrochromic SPD film 13.3 or SPD film unit, an outer sheet 13.2 made of transparent PC, PMMA or glass, a transparent interlayer 13.4 between the inner sheet 13.1 and the SPD film 13.3 to attach the inner sheet 13.1 on the SPD film 13.3, and a further transparent interlayer 13.5 between the outer sheet 13.1 and the SPD film 13.3 or SPD film unit to attach the outer sheet 13.2 on the SPD film 13.3. The material of the interlayers 13.4 and 13.5 may be polyurethane (PU), polyvinylbutyral (PVB), or ethylenvvinylacetate (EVA) in the form of a foil. An inside surface of the inner sheet 13.1 corresponds to the inside surface 11.2 of the switchable window 11.

The outer pane construction 12 comprises a PMMA pane 12.1. An outside surface of the outer PMMA pane 12.1 corresponds to the outside surface 11.1 of the switchable window 11. The transparent PMMA pane 12.1 is of clear acrylic and it includes as additives an IR absorber that may comprise nanoparticles of hexaboride, for instance, KHDS-872G2 containing LaB6 commercially available from Sumitomo Metal Mining, a dye based on perylene for improving and supporting the ability of IR absorption, for instance, LUMOGEN IR 788 commercially available from BASF Corporation, and an UV absorber containing a chromophore, for instance, CGX UVA 006 commercially available from BASF Corporation. The PMMA pane 12.1 shows approximately 0% transmission in an UV range <400 nm wavelength, a high maximum transmission of approximately 83% in the visible light range of 400 nm to 780 nm, and a decreasing transmission of approximately 20% or less in an IR range from 780 nm to 2500 nm. Consequently, approximately 100% of UV radiation and approximately 80% of IR radiation are absorbed by the PMMA pane 12.1.

The PMMA pane 12.1 may comprise a transmission of visible light of up to approximately 83% (=LT) and a total solar energy transmission of up to approximately 50% (=TSE) resulting in a high transmission ratio LT/TSE of up to 1.66.

The spacing 14 or distance between the outer sheet 13.2 of the inner pane construction 13 and the PMMA pane 12.1 of the outer pane construction 12 avoids the direct heat transfer from the PMMA pane 12.1 to the outer sheet 13.2 of the inner pane construction 13 to protect the SPD film 13.3 against heat from the PMMA pane 12.1. Most heat resulting from the IR absorption and UV absorption in the PMMA pane 12.1 is dissipated into outside air.

The invention claimed is:

1. A switchable window for an aircraft, helicopter, or space vehicle, the switchable window comprising:
    an outer pane construction subjected to sunlight; and
    an inner pane construction having an electrically switchable film for changing a color or transmittance of the switchable window, the outer pane construction covering at least an irradiated part of the inner pane construction, wherein
    the outer pane construction absorbs IR radiation of the sunlight, and absorbs UV radiation of the sunlight,
    the outer pane construction comprises at least one transparent pane,
    the at least one transparent pane comprises:
        an IR absorber including nanoparticles of hexaboride, and
        an UV absorber including a chromophore,
    the outer pane construction and the inner pane construction are arranged with a spacing therebetween, and
    the at least one transparent pane of the outer pane construction includes a polymethylmethacrylate (PMMA) pane having a transmission of visible light LT greater than 80% and a total solar energy transmission TSE lower than or equal to 55% resulting in a transmission ratio LT/TSE greater than or equal to 1.45.

2. The switchable window according to claim 1, wherein the at least one transparent pane of the outer pane construction comprises a further PMMA pane arranged in parallel to said PMMA pane with a distance or spacing therebetween.

3. The switchable window according to claim 1, wherein the at least one transparent pane includes a perylene based dye.

4. The switchable window according to claim 1, wherein the at least one transparent pane of the outer pane construction and the electrically switchable film of the inner pane construction are arranged with a distance or spacing therebetween.

5. The switchable window according to claim 1, wherein the electrically switchable film is an electrochromic device.

6. The switchable window according to claim 5, wherein the electrochromic device comprises a suspended particle device (SPD) emulsion or a polymer dispersed liquid crystal (PDLC) film.

7. The switchable window according to claim 1, wherein the inner pane construction is a suspended particle device (SPD) electrochromic laminated panel.

8. The switchable window according to claim 1, wherein the at least one transparent pane of the outer pane construction includes a double glazing structure unit comprising:
    said PMMA pane, and
    a glass pane, a polycarbonate pane, or a further PMMA pane.

9. The switchable window according to claim 1, further comprising:
    a dust protective cover sheet arranged on an inside of the switchable window, wherein
    the inner pane construction with the electrically switchable film is arranged between the protective cover sheet and the outer pane construction.

10. The switchable window according to claim 9, wherein the dust protective cover is a polycarbonate cover.

11. The switchable window according to claim 1, wherein the outer pane construction has a shape that is curved away from the inner pane construction.

12. The switchable window according to claim 1, further comprising:
    a circumferential continuous frame, rabbet or encapsulation in which a circumferential edge of the inner pane construction is fixed in a corresponding circumferential groove of the frame, rabbet or encapsulation, wherein
    the outer pane construction has a circumferential edge which is fixed in a corresponding circumferential continuous further groove of the frame, rabbet or encapsulation.

13. The switchable window according to claim 1, wherein the inner pane construction is a laminated suspended particle device (SPD) panel comprising:
    an inner sheet of polycarbonate (PC), PMMA or glass,
    said electrically switchable film being an electrically switchable electrochromic SPD film,
    an outer sheet of PC, PMMA or glass,
    an interlayer between the inner sheet and the SPD film to attach the inner sheet on the SPD film, and
    a further interlayer between the outer sheet and the SPD film to attach the outer sheet on the SPD film, wherein an inside surface of the inner sheet corresponds to an inside surface of the switchable window.

14. The switchable window according to claim 13, wherein
    the SPD film is electrically coupled via wiring to a switch that is electrically coupled to a power line supplying AC voltage of the aircraft, helicopter, or space vehicle,
    when the switch is ON, AC voltage is applied across the SPD film to maintain the SPD film in a transparent state, and when the switch is OFF, no AC voltage is applied across the SPD film to switch the SPD film into an opaque non-transparent state.

15. The switchable window according to claim 1, wherein said PMMA pane of the outer pane construction has
- approximately 0% transmission in an UV range of wavelengths below 400 nm,
- a maximum transmission of approximately 83% in the visible light range of wavelengths from 400 nm to 780 nm, and
- a decreasing transmission of approximately 20% or less in an IR range of wavelengths from 780 nm to 2500 nm, and said PMMA pane absorbs approximately 100% of UV radiation and approximately 80% of IR radiation.

* * * * *